J. HAINES.
FRUIT-JAR.
No. 175,244. Patented March 28, 1876.
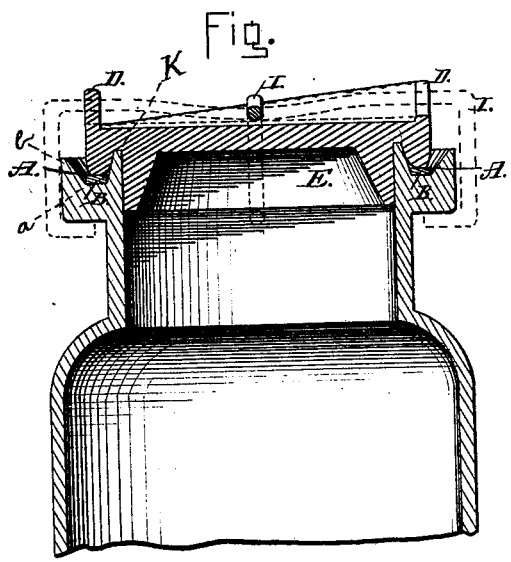
WITNESSES:
H. Graham
W. J. Hutchinson
INVENTOR:
Joel Haines
PER. Daniel Breed
ATTORNEY.

UNITED STATES PATENT OFFICE.

JOEL HAINES, OF WEST MIDDLEBURG, OHIO.

IMPROVEMENT IN FRUIT-JARS.

Specification forming part of Letters Patent No. 175,244, dated March 28, 1876; application filed May 1, 1875.

*To all whom it may concern:*

Be it known that I, JOEL HAINES, of West Middleburg, in the county of Logan and State of Ohio, have invented an Improvement in Fruit-Jars, of which the following is a specification:

The nature of my invention consists in the construction of the jar and cover, as will be hereinafter fully described, and pointed out in the claim.

In the accompanying drawings, the figure is a vertical section of the mouth and cover of my improved jar.

My improved fruit-jar is made with a double lip, $a\ b$, and a deep furrow or groove between the lips, as seen at A in the accompanying drawings. This groove A is made with a flat bottom, into which is fitted a piece or flat ring of india-rubber, as seen at B, Fig. 1. This broad flat surface of rubber gives a little room for the lip of the cover to slide and yet meet a perfectly flat surface, as the cover is forced down, by turning the bail or clamp upon the incline or cam D of the cover, in the usual manner.

The lip $b$ on the jar is beveled toward the top, so as to fit snugly within a corresponding groove, K, in the cover. The groove in the cover forms two solid lips, one lip entering within the mouth of the jar, and the other lip entering the groove A, so as to seal the jar, in connection with the rubber band in said groove, when the cover is forced down.

Now, in case the rubber ring is lost, or if a person prefers to use wax for sealing the jar, my jar, with the groove A, is perfectly adapted to this mode of sealing by wax.

The cover E is provided with two inclines or cams, as seen at D, Fig. 1, and the bail or clamp I is hooked under the rim of the jar, and then turned round until it clamps the cover tight upon the rubber B, and thus seals the can.

By the above construction my jar is a self-sealer, and when the rubber ring is lost, then it is equally suited to sealing with wax, which is very important in packing fruit.

I am aware of the patent granted Pierre F. Darche, March 23, 1875, No. 161,210, in which the cover is secured by an annular cork, forming an interior flange, and I am also aware that the clamping device is not new; but

I claim as my invention—

The combination, with the jar having a flat-bottomed groove, A, and beveled lip $b$, of the cover having a corresponding groove, K, forming two solid lips, one fitting within the mouth of the jar and the other within the groove A, the rubber ring B, and clamping-bail, substantially as and for the purpose specified.

JOEL HAINES.

Witnesses:
DANIEL BREED,
A. E. REDSTONE.